No. 826,883. PATENTED JULY 24, 1906.
F. B. PREWETT.
MICROMETER CALIPERS.
APPLICATION FILED APR. 6, 1906.
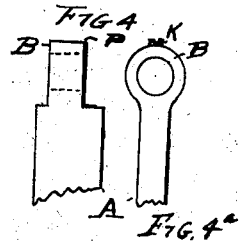
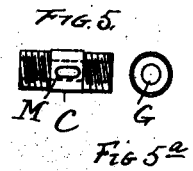
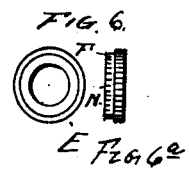
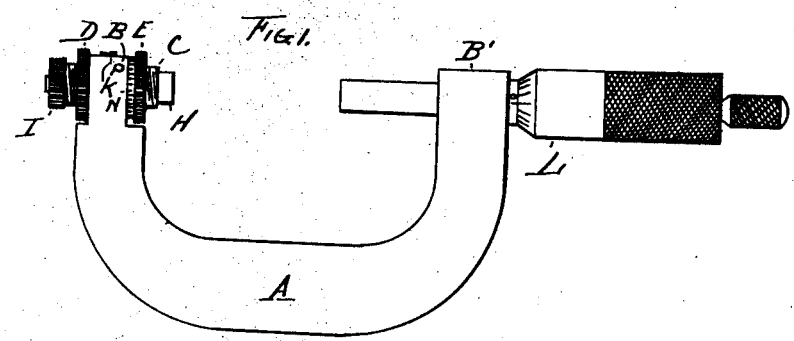
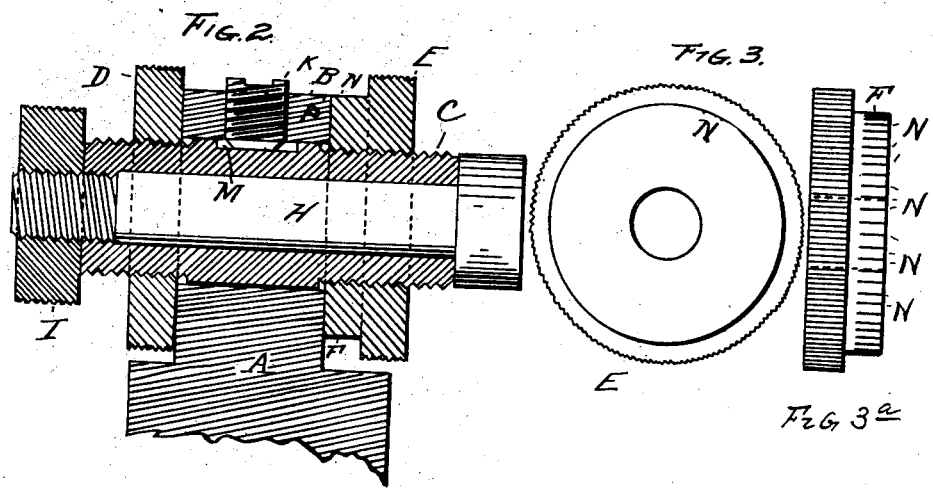

UNITED STATES PATENT OFFICE.

FRIEND B. PREWETT, OF LOGANSPORT, INDIANA.

MICROMETER-CALIPERS.

No. 826,883.   Specification of Letters Patent.   Patented July 24, 1906.

Application filed April 6, 1906. Serial No. 310,270.

*To all whom it may concern:*

Be it known that I, FRIEND B. PREWETT, a citizen of the United States, residing at Logansport, in the county of Cass and State of Indiana, have invented certain new and useful Improvements in Micrometer-Calipers, of which the following is a specification.

The object of my invention is to provide a micrometer which will be simple in construction and which may be manipulated with ease and rapidity.

Another object of my invention is to provide a gage that will be of greater utility as well as range than those now existing.

My gage is composed of seven parts—namely, the body or frame, a hollow cylinder externally threaded at each end, a milled lock-nut, a milled adjusting-nut, a spindle, one end of which is externally threaded, a milled nut for the above spindle, and a set-screw.

Referring to the drawings, Figure 1 is a side view of the instrument complete. Fig. 2 is an enlarged longitudinal section of the adjusting device through the head of the frame. Figs. 3 and 3ª show an enlarged detail view, in face and edge views, of the adjusting-nut. Figs. 4 and 4ª show a detail view, in face and edge views, of a portion of the frame. Figs. 5 and 5ª show a detail view, in side and end elevations, of the cylinder. Figs. 6 and 6ª show, in front and edge elevation, a detail view of adjusting-nut.

Similar letters refer to similar parts throughout the different views.

A is the frame of the gage, and B one of its hollow heads, which is adapted to receive the hollow cylinder C. The cylinder C is threaded externally at each end in order to receive the milled lock-nut D and the adjusting-nut E. The adjusting-nut E is graduated on its periphery F with fine lines, the said lines N representing so many equal spaces, to which I will again refer later.

The cylinder C is hollow at G and is adapted to receive the spindle H, the latter being threaded to receive the milled nut I.

It is intended to use the invention in connection with other devices, as shown in Fig. 1, the device L not being part of this invention. The invention when used in the frame A at B and B' is then complete in itself as a micrometer.

The cylinder C is longitudinally grooved for the reception of the point of the set-screw K. The object of the longitudinal groove M is to limit the travel of the cylinder C. Without this groove M the cylinder C might work out and become lost or the cylinder would turn in the head B.

To use the device, retract the nut D and turn the adjusting-nut E as many spaces as one-thousandths of an inch are desired, and then tighten again nut D against the frame A. This will lock the spindle at the desired place. When turning the adjusting-nut E, the line N should be opposite the line P on the frame A. For every space or line N the adjusting-nut is moved the spindle-bar travels to or fro one one-thousandth of an inch, the direction the bar H travels depending on which way the adjusting-nut is revolved.

In order to measure bars or other objects of various diameters, I provide extra spindles H of various lengths. The spindle H can be removed from cylinder C and replaced by any other spindle H. This gives a larger range and utility.

What I claim as my invention, and desire to secure by Letters Patent, is—

1. In a micrometer-gage, the frame A, with a hollow head B, in combination with a hollow cylinder C, the cylinder being externally threaded at each end, a milled lock-nut and adjusting-nut on the ends of said cylinder, and the spindle-bar H, the hollow cylinder being adapted to slide in the hollow head B, the hollow cylinder being adapted to receive the spindle-bar H, substantially as described.

2. In a micrometer-gage, the frame A having a hollow head B, a hollow cylinder externally threaded at each end, a lock-nut and adjusting-nut on the ends of said cylinder, the latter adapted to slide in said hollow head B, the cylinder being grooved longitudinally externally at M, in combination with a spindle-bar H, the bar being externally threaded at one end, a milled nut on said externally-threaded end, the bar H being adapted to fit in the hollow of the cylinder C, substantially as described.

3. In a micrometer-gage, the frame A having hollow heads B and B', a set-screw K, a hollow cylinder C, the cylinder being externally threaded at each end, a nut D and an adjusting-nut E on the ends of said cylinder, the cylinder being adapted to slide in said hollow head B, the cylinder having a groove M and said screw K to prevent the cylinder from turning, in combination with a spindle-bar H, the said bar being threaded at one end, a nut on said end, the said bar being adapted to fit in the cylinder C, substantially as described.

4. In a micrometer-gage, the frame A having hollow heads, a set-screw, cylinder C, the cylinder being externally threaded at each end, a lock-nut and an adjusting-nut on the said ends, the said nut being graduated on its periphery by fine lines; the cylinder C being adapted to slide in the hollow head B' in combination with a spindle-bar H, the said bar being externally threaded at one end, the nut on said externally-threaded end, substantially as described.

5. In a micrometer-gage, the frame A having hollow heads B and B', a set-screw K, the said screw being to prevent the cylinder C from turning, a hollow cylinder C, the cylinder being threaded at each end, the lock-nut D and the adjusting-nut E on the ends of said cylinder, the cylinder having a groove M for the reception of the set-screw K, and said cylinder being adapted to move in the head B in combination with a spindle-bar H, the said bar having a thread at one end, a nut on said end, said bar being adapted to fit into the cylinder C, substantially as described.

In testimony whereof I affix my signature in presence of two witnesses.

FRIEND B. PREWETT.

Witnesses:
A. W. KAUFMAN,
WM. A. GOULD.